Figure 1:
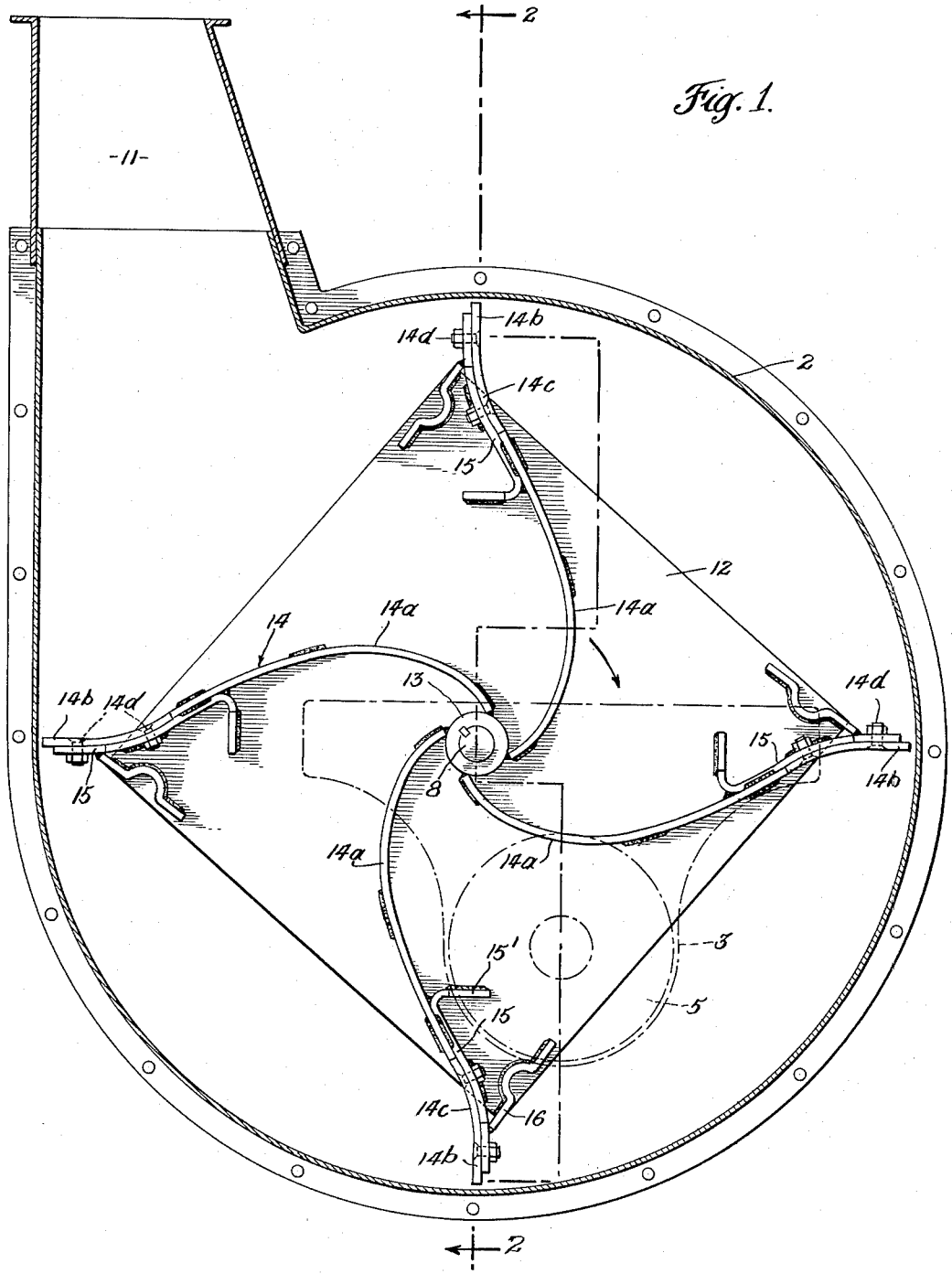

July 5, 1955

J. R. WEST 2,712,412

FORAGE BLOWER

Filed Aug. 26, 1952

2 Sheets-Sheet 1

INVENTOR
James R. West
By Richard E. Babcock Jr.
ATTORNEY

July 5, 1955 — J. R. WEST — 2,712,412
FORAGE BLOWER
Filed Aug. 26, 1952 — 2 Sheets-Sheet 2

INVENTOR
James R. West
By Richard E. Babcock Jr.
ATTORNEY

United States Patent Office 2,712,412
Patented July 5, 1955

2,712,412
FORAGE BLOWER

James Rex West, New Holland, Pa., assignor to The New Holland Machine Division of The Sperry Corporation, New Holland, Pa., a corporation of Delaware Application August 26, 1952, Serial No. 306,403

3 Claims. (Cl. 230—134)

This invention relates to a forage blower of the type in which material delivered into the central portion of a generally cylindrical blower housing is centrifugally discharged through a tangentially directed discharge port by means of a blower or impeller rotating in said housing.

It is the primary object of the invention to provide an improved blower or impeller unit adapted for use in such a forage blower. To this end the unit is so designed as to discharge incoming material more rapidly and completely than is possible in conventional blowers, thus avoiding jamming or clogging and enabling the handling of larger volumes of material in proportion to the power consumed.

Generally speaking, in prior forage blowers of this type, the blower blades or vanes of the blower unit have extended substantially radially from the rotational axis of the blower, and thus have had a positive circumferential abutment or engagement with the material entering the blower so that immediately upon contact with the blades the material has had to rotate with and at the same speed as the blower unit. In the operation of such blowers considerable power has been required to thus instantaneously overcome the inertia of the material to initiate its rotation. Also, the material often has been firmly pressed against the radial blades, both by air pressure and by its inertia, with the result that there has been produced a frictional engagement resisting the radially outward movement of the material along the blades and causing the material to whirl around with the blades several times before being discharged. Where this occurs it is obvious that the efficiency and also the capacity of the blower will be lowered and the blower may be jammed or choked with the material. In accordance with the present invention, the inertia of the material instead of constituting a drag reducing the efficiency of the blower, is taken advantage of to cause movement of the material radially toward the outer periphery of the blower unit where it is discharged.

To this end, the blower blades are spirally curved away from the rotation of the blower, so that the material engaged by them instead of being positively engaged and immediately rotated at the same speed as the blower unit, is caused by its inertia to slide along said spiral blades in a circumferential direction to be thus moved radially outward.

The blower unit of the invention also includes generally radial tips or outer portions constituting continuations of the respective blades and preferably faired thereinto to provide a smooth transition for the outwardly moving material as it passes from the spiral sections to the radial tips of the blades. These radial blade tips or portions thus serve to rotate the material at the same speed as the blower just prior to discharge of the material, whereby it will be tangentially discharged from the respective blades at high velocity. The radial blade sections or tips also produce an increased volume and velocity of air flow through the discharge opening to efficiently convey the discharged material to its destination.

Thus in accordance with the invention, the spirally curved sections of each of the blades will function primarily to cause radially outward movement of the material, and thus to maintain the central portion of the blower unit clear for the reception of infeeding material, while acting through its sliding engagement with the material to gradually accelerate its rotational speed until the material is delivered to the radial tips which positively circumferentially abut against the material and cause it to rotate at a maximum speed equal to that of the blower unit before tangentially discharging it.

Figure 2:
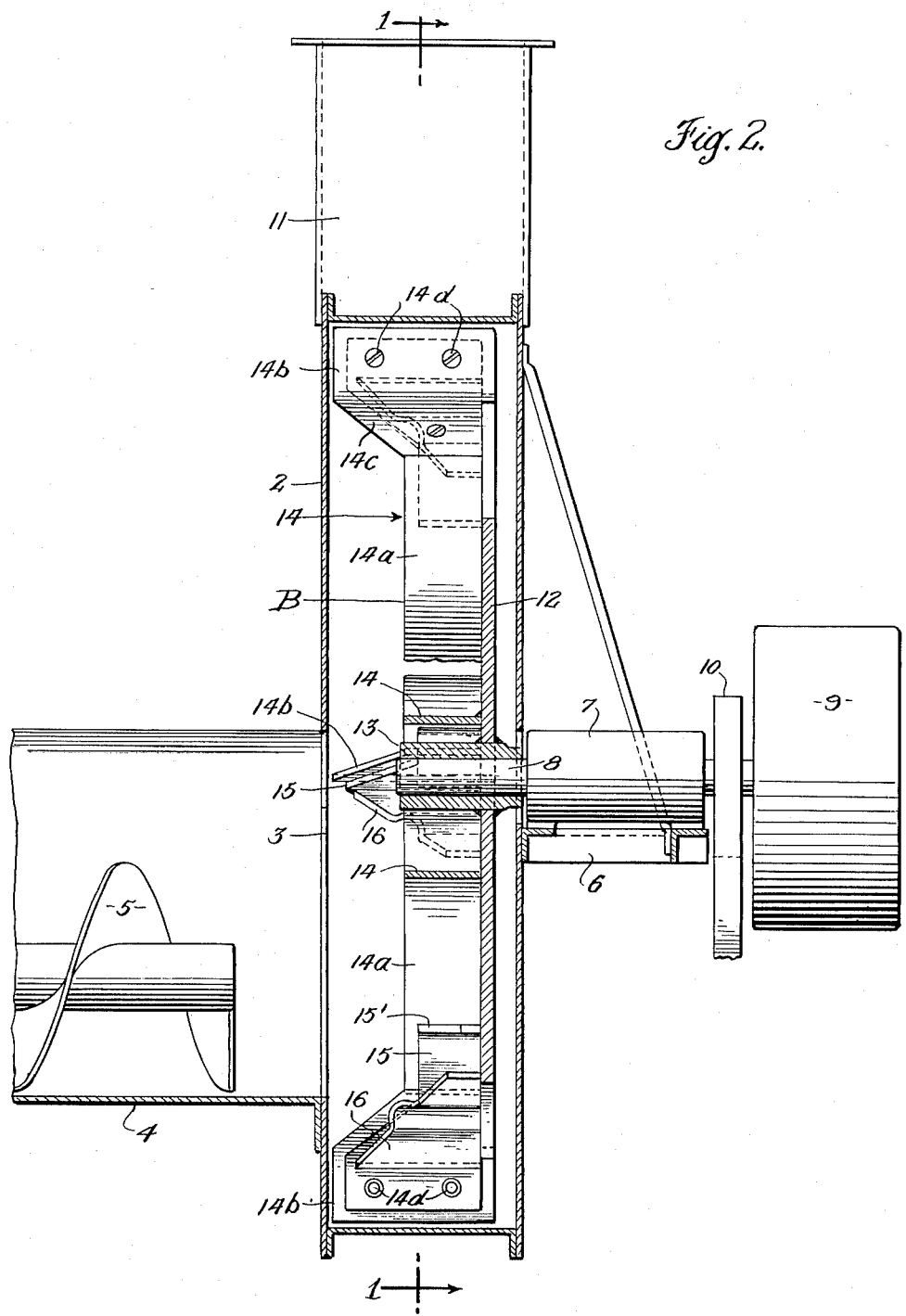

The foregoing objects and advantages are all attained by the preferred embodiment of the invention illustrated in the accompanying drawings, in which:

Figure 1 represents a cross-sectional view through a blower casing, taken on the line 1—1 of Figure 2, showing the blower or impeller unit in front elevation and indicating the front of the casing and its infeed opening and cooperating feed mechanism in broken lines; and, Figure 2, a section on the line 2—2 of Figure 1.

Referring now in detail to the accompanying drawings, the reference character 2 designates a usual cylindrical blower housing or casing, indicated in broken lines, having a substantially centrally disposed infeed opening 3 through one of its end walls, the opening 3 communicating with usual conveyor mechanism, such as the trough 4 having an auger 5 operative therein to feed material into the opening 3.

Fixed on the rear axial end wall of housing 3 is a bracket 6 functioning as a support for a bearing 7 in which is rotatably journalled a blower shaft 8 having suitable drive means such as the sheave or pulley 9 thereon whereby rotation may be imparted to the shaft 8 by a belt from any suitable source of power.

A suitable belt drive 10 from the shaft 8 may be employed if desired to drive auxiliary mechanism, such as a conventional molasses mixer or injector (not shown) for treating the material which passes through the blower.

The blower shaft 8 projects into the housing 2 coincidently with the cylindrical axis of the housing, and a blower or impeller unit or element B keyed on shaft 8 rotates therewith within the housing. The unit B receives material entering the housing through the infeed opening 3, whirls it around and discharges it tangentially through the tangentially directed discharge port or passage 11 which communicates with the interior of the housing 2.

In general the arrangement thus far broadly described is old and well known and therefore is not claimed as the invention.

The improved features of the instant invention are found in the rotary impeller or blower unit B. Such a unit or element desirably includes a rigid metal backing plate 12 supported on a central hub 13 which is fixed on the shaft 8 for rotation therewith. Secured on the front face of the plate 12 as by welding in edgewise relation thereon are a plurality of impeller blades or vanes 14 which extend outwardly from the hub 13 and preferably have their inner ends welded against and braced by the outer periphery of the hub 13. With the inner ends of the blades thus abutting against the hub, it will be impossible for outwardly moving material to catch on them.

Further bracing may be provided outwardly from the blower center by blade seats 15 welded in edgewise relation against the plate 12, each such seat abutting flush against and conforming in shape to the adjoining portion of its respective blade, which may be rigidly secured to its cooperating seat as by welding. Each such blade seat 15 is supported against deflection on the backing plate 12 by means such as the rearwardly bent web portion 15' welded in edgewise relation against the plate 12. Also, if desired the outer ends of the blade seats 15 may be reinforced against both angular and circumferential deflection by means such as the braces 16 welded between the plate 12 and each such blade seat, the braces 16 in the instant embodiment being in edgewise relation to the plate 12 and being provided with medially offset or bowed portions as shown to increase their stability on backing plate 12.

The inner portion 14a of each such blade 14 is rearwardly spirally curved away from the direction of rotation (indicated by the arrow in Figure 1) of the unit B.

By virtue of such spiral curvature of the several blade portions 14a, it will be apparent that material delivered into the blower housing through opening 3 will be subjected to a glancing impact by the respective portions 14a so that the material may be caused by its inertia to slide circumferentially relative to the blades and thus be impelled outwardly from the axis of the shaft 8.

Each of the blade portions 14a terminates outwardly in a substantially radially directed tip 14b which is preferably faired into the spirally curved inner portion of the blade by a relatively reversely curved transition portion 14c. Such portion 14c provides a smooth passage for material as it passes from the spiral portion 14a to the radial tip 14b of each blade. Moreover such a curved transition or connecting portion 14c serves to gradually decrease the circumferential movement or lag of the material relative to the blower unit, until it moves onto the radial tip 14b which causes it to rotate at equal speed with the blower until it moves opposite to the discharge port 11 and is projected tangentially into the same.

Since the blade tips 14b are normally subjected to more rapid wear and are more subject to damage than the inner portions of the blades 14, the tips 14b and their associated transition portions 14c may be formed as integral replaceable units separate from the spirally curved inner blade portions 14a.

In the illustrated embodiment, each of these replaceable tips is removably bolted at 14d on its conformingly shaped seat 15, with the inner edge of its transition portion 14c in abutting contiguous relationship with the outer end edge of its associated spiral portion 14a. With such arrangement each blade 14 may have a continuous operative surface throughout its entire length.

Preferably the inner portions 14a of the respective blades are of a width substantially less than that of the blower casing, and their front edges are spaced substantially away from the front end of the casing, to provide clearance for incoming material between these blade portions 14a and the edges of the infeed opening 3. However, the blade impeller tips 14b, which at no time register with the opening 3, may be formed of full width to project substantially entirely across the casing 2, all in accordance with usual practice.

Preferably the spiral portion 14a of each blade is radially inclined to such an extent as to move the material rapidly away from the center of the blower, but the extent of such inclination is maintained short of the point which may cause these spiral portions 14a to wedge material against the inner cylindrical periphery of the blower casing 2, thereby creating frictional drag or resistance to rotation of the blower unit and decreasing its efficiency accordingly.

In the instant embodiment, such requirements are met by curving the inner portion 14a of each blade or vane in the form of a logarithmic spiral which at all points is inclined at 40° to intersecting radii from the rotational axis of the blower unit. Thus material fed into said unit will impact against the blade portions 14a at the same angle of incidence any where along said blades to be deflected substantially radially outwardly responsive to rotational movement of the blades.

The advantage of employing a blade curvature in the form of a logarithmic spiral consists in attaining such a constant angle of incidence at which the incoming material will impact against the blades at any point along the length of the blade sections 14a, and also in the resulting substantially constant rotational acceleration of such material until it attains the same rotational speed as the blade impeller tips 14b just prior to its discharge from the blower element.

In the operation of the blower unit of the invention it will be seen that as material enters the blower housing 2 through the opening 3 it is engaged by the blade sections 14a, the spiral curvature of which urges the material immediately outwardly, due to the inertia of the material which causes it to rotate at a lesser speed than the unit B and thereby to ride outwardly along the spiral surfaces of the blades 14a until it reaches the blade portions 14c which serve to increase the rotational speed of the material while transferring it to the radial impeller tips 14b. At the time the material reaches the impeller tips 14b it will be rotating at the same speed as the blower B and thus will be tangentially discharged through the port or discharge opening 11 at a maximum velocity. As is well known, the several blades 14 will similarly act upon air to cause a constant rapidly moving current of air through the discharge passage 11 to assist in conveying the material.

In this application there is shown and described only the preferred embodiment of the invention simply by way of illustration of its practice as by law required. However, it is recognized that the invention is capable of other and different embodiments, and that its several details may be modified in various ways all without departing from the invention. Accordingly, the drawings and description herein are to be construed as merely illustrative in nature and not as exclusive.

Having thus described my invention, I claim:

1. A blower unit comprising a central hub adapted for rotation in a given direction, a plurality of blades secured on said hub with their inner ends abutting thereagainst, said blades extending outwardly from said hub and curved in the form of similar logarithmic spirals away from the direction of rotation thereof, each blade terminating in a substantially radial impeller tip, whereby material received in said unit may be moved radially outwardly by said blades and gradually accelerated to the same rotational speed as the blower unit, to be then engaged by the radial tips and rotated at the same speed as the unit prior to being discharged tangentially from the unit.

2. A blower unit comprising a central hub adapted for rotation in a given direction, a plurality of blades secured on said hub with their inner ends abutting thereagainst, said blades extending outwardly from said hub and curved in the form of similar logarithmic spirals away from the direction of rotation of said hub and concentric to said hub, whereby material received in said unit will be engaged by the respective blades at a uniform angle of incidence by said blades throughout the lengths of their spirally curved portions.

3. A blower unit comprising a central hub adapted for rotation in a given direction, a plurality of blades connected to said hub for rotation therewith, said blades extending outwardly from said hub and curved in the form of similar logarithmic spirals away from the direction of rotation of said hub and concentric to said hub, whereby material received in said unit will be engaged by the respective blades at a uniform angle of incidence by said blades throughout the length of their spirally curved portions.

References Cited in the file of this patent

UNITED STATES PATENTS

| | | |
|---|---|---|
| 318,884 | Dwight | May 26, 1885 |
| 517,524 | Landis | Apr. 3, 1894 |
| 617,520 | Capell | Jan. 10, 1899 |
| 888,875 | Crosby | May 26, 1908 |
| 1,462,557 | Kuenzel | July 24, 1923 |
| 2,192,802 | Pound | Mar. 5, 1940 |